United States Patent Office 2,791,537
Patented May 7, 1957

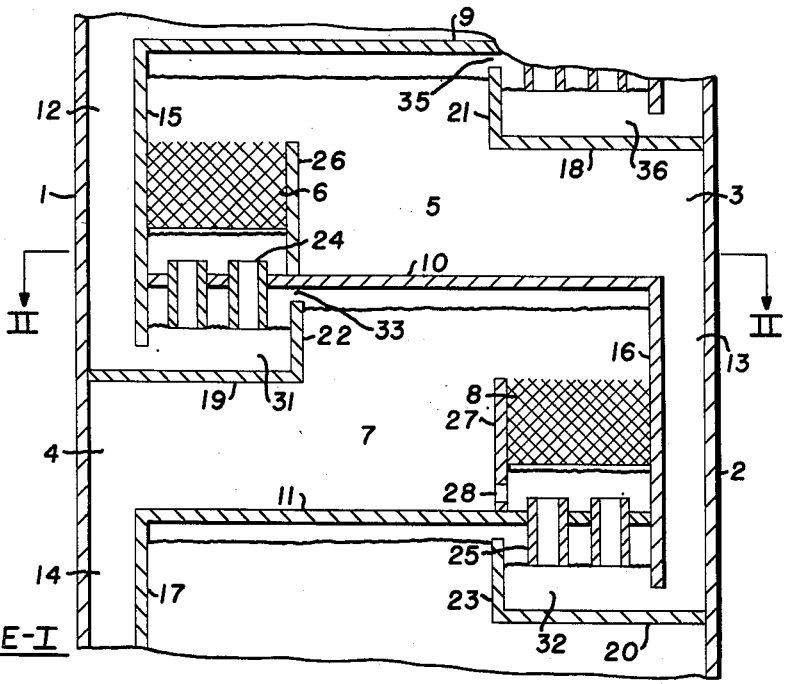
FIGURE-I
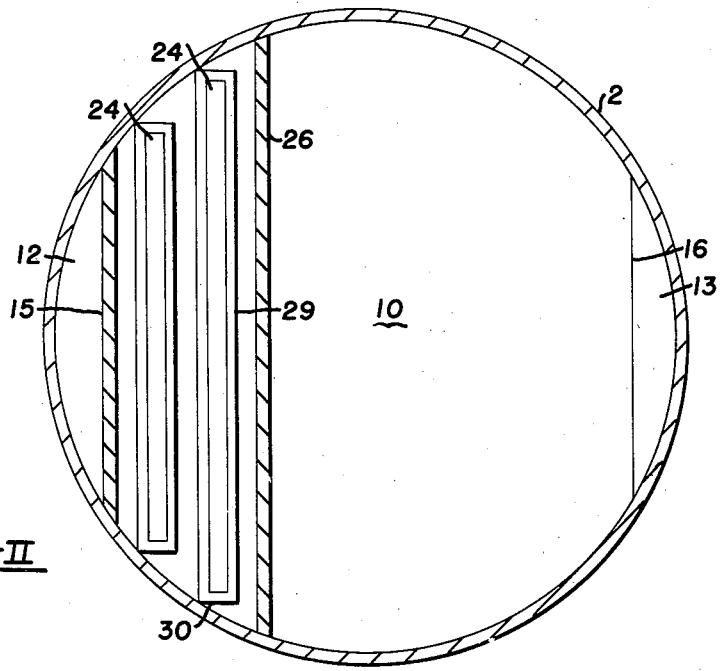
FIGURE-II
Robert B. Long
Clinton H. Holder
James R. Felix
Arthur L. Saxton
Inventors
By W. N. Wright Attorney May 7, 1957 J. R. FELIX ET AL 2,791,537
LIQUID-LIQUID CONTACTING
Filed Sept. 30, 1953 2 Sheets-Sheet 2
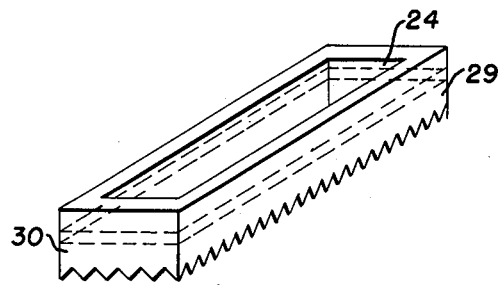
FIGURE-III
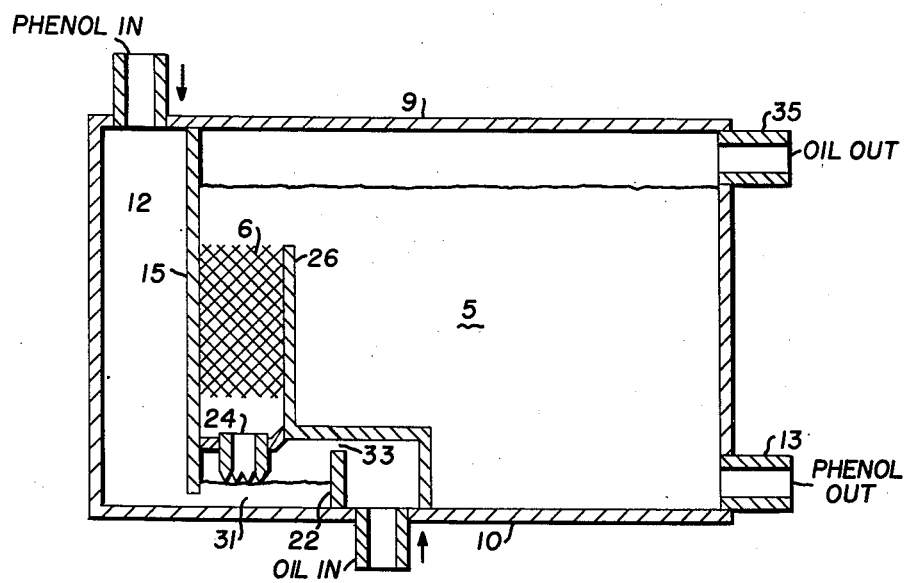
FIGURE-IV
Robert B. Long
Clinton H. Holder
James R. Felix
Arthur L. Saxton
Inventors
By C. N. Wright Attorney

2,791,537

LIQUID-LIQUID CONTACTING

James R. Felix, Plainfield, Robert B. Long, Wanamassa, Clinton H. Holder, Westfield, and Arthur L. Saxton, Plainfield, N. J., assignors to Esso Research and Engineering Company, a corporation of Delaware Application September 30, 1953, Serial No. 383,292

8 Claims. (Cl. 196—14.52)

The present invention relates to an improved process and apparatus for the countercurrent contacting of two incompletely miscible liquids having different densities wherein one of the liquids is present as a continuous phase in the apparatus and the other liquid as a discontinuous phase. The invention has particular application in the field of liquid-liquid extraction wherein one liquid is contacted with a second liquid for the purpose of removing desirable or undesirable constituents from the former liquid as the case may be. In accordance with the present invention a novel contacting stage construction is employed in a vertical tower which is characterized by providing concurrent mixing and concurrent settling in each stage throughout the tower while maintaining counter-current flow between stages.

The invention is directed broadly to processes in which liquids are treated by selective solvent action. At the present time there are a great many chemical processes in which a selective solvent is used to treat a particular liquid in order to secure a partial segregation or removal of chemical constituents from the liquid. For example, petroleum oils are conventionally treated with solvents such as liquid sulfur dioxide, phenol, cresol, nitrobenzene, furfural, aniline, ether and other solvents or mixtures of such solvents. Contact of these solvents with a petroleum oil is particularly employed to remove low viscosity index constituents from the oil and thereby obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications of a process nature are used to control the solvent extraction as desired— for example, auxiliary solvents or modifying agents may be injected into the treating system. Again a wide range of temperature and pressure conditions may be employed in particular types of solvent extractions. The present invention, however, is not concerned with these types of modifications or refinements. Instead, it is concerned with a basic apparatus that may be used for contacting liquids whatever the particular system may be. It is, therefore, to be understood that this invention is of application to any liquid-liquid contacting system with any of the modifications that may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types, some employing various types of packing materials, others employing perforated plates, and still others employing a wide variety of internal baffles and solid plates.

A conventional liquid-liquid contacting tower generally consists of a large number of contacting stages that extend throughout the tower. A very common type of tower, for example, contains a plurality of perforated horizontal metal plates that are vertically spaced one above the other throughout the tower. Sets of perforations in the plates allow one of the liquids to pass from plate to plate through the tower, while downcomers or other sets of perforations are provided to convey the other liquid from one plate to another in a direction counter-current to the first liquid. The downcomers, perforations, etc., associated with the plates are generally positioned so as to provide horizontal flow of one or both of the liquids across the various plates and thereby induce more complete contacting between the liquids and a closer approach to equilibrium mass transfer. For example, where downcomers are employed it is general practice to position the downcomers of successive plates on diametrically opposite sides of the contacting tower.

In analyzing the necessary mechanism required in liquid-liquid contacting it is apparent that certain basic effects are required. These are efficient utilization of each liquid phase so that all portions of it are put in intimate contact with all of the other phase in each stage. Efficient mixing is required for this purpose. The mixing step must then be followed by means for efficient separation of the mixed liquids. Thus in extraction towers having a given number of stages, for the best overall results it is necessary that each stage provide intimate and uniform dispersion of the total flow of both phases, good mixing, and also good settling. Only by achieving these desiderata in such a tower is it possible to secure treating effects equivalent to a large number of theoretical stages. It is, therefore, a particular object of this invention to provide a type of apparatus which will most effectively be capable of intimately contacting and adequately mixing all portions of both liquid phases in each stage and then thoroughly settling the mixed liquid phases.

In order to secure efficient mixing and settling of the liquids it is necessary to consider the basic characteristics of the liquids insofar as their mixing and settling properties are concerned. Thus, particular liquids such as phenol and oil may be very readily mixed and when mixed may be difficult to separate. Alternatively, other types of liquids such as aqueous caustic and oil, for example, may be difficult to mix but may be readily separated. As a result of this factor it is generally necessary to critically design and operate a conventional extraction tower to secure the optimum treatment of liquids having particular mixing and settling characteristics. It is, therefore, a further object of this invention to provide a contacting tower that may be readily adapted to the optimum contacting conditions for liquids having various mixing and settling characteristics.

The perforated-plate tower described above as well as other conventional types of towers possess a number of disadvantages. First, the contacting stages employed therein are generally characterized by plate or stage efficiencies not substantially greater than about 50%. The low efficiency results primarily from incomplete contacting of the two liquid phases in the region of phase mixing and also from the short time of actual contact between the phases during mixing. The term "plate-" or "stage-efficiency" means that a given plate is effective in accomplishing a certain percentage of the degree of contacting that is realized at equilibrium by a single batch stage mixer and settler. Thus, one theoretical stage is established by contacting two liquids intimately to equilibrium in a batch mixer followed by a thorough settling in a batch settler. As stated, therefore, conventional plate liquid contacting towers, due to their plate efficiencies of about 50% maximum, require for a given separation a number of plates exceeding by about a factor of two the number of theoretical stages of contacting that would be required. It is clearly of the greatest importance to improve the plate efficiency of the types of plates used in plate-type towers in order to decrease the expense of the contacting and also to decrease the size of the towers that are used for contacting and solvent regeneration. It is, therefore, a principal object of this invention to provide an improved type of plate extraction tower in which the plate efficiencies are substantially above 50%.

A second disadvantage of conventional perforated-plate, liquid-liquid towers lies in the fact that it is generally difficult to maintain an interface between the discontinuous phase liquid and the continuous phase liquid at each of the contact plates except within a relatively narrow range of phase flow rates and phase physical properties. This results from the fact that the interface position is normally dependent upon the rate of flow of one phase or both phases through the tray perforations and also upon the physical properties of the phases. It is essential in this connection that such interfaces be continuously present between successive plates in order to prevent one or both of the liquids from by-passing the plates or otherwise upsetting the operation. The occurrence of by-passing causes marked reductions in the efficiency of the contacting device. It is particularly difficult to maintain such liquid layers and the attendant interface positions within a perforated-plate tower when the tower is operated over a relatively wide range of conditions, flow rates, etc. It has been necessary therefore to closely follow and control the operation of such a tower as well as other conventional towers in order to prevent upsets in operation, by-passing of the plates and the like.

A third disadvantage of perforated-type plates is the fact that each of the perforations functions as an orifice and this condition gives rise to undesirable pressure drops. Furthermore, these pressure drops are not very efficiently converted into energy for mixing the two liquids being processed.

Accordingly, it is an object of the present invention to provide a liquid-liquid contacting tower that is characterized not only by high plate efficiencies but also by simplified and flexible operation. It is a particular object to provide a liquid-liquid contacting tower in which the phase interface positions are relatively independent of the phase flow rates and which is self-compensating to changes in phase flow rates or phase physical properties. Thus, the towers of the present invention are essentially limited only by the settling requirements of the phases.

The objectives enumerated above are realized in accordance with the present invention by a liquid-liquid contacting stage construction which comprises in combination a horizontal settling zone, a vertical mixing zone and a liquid trap chamber. Referring first to the settling zone portion of the present stage design, this zone is an enclosed space of a character adapted to separate dispersions of two incompletely miscible liquids that have different specific gravities. The settling zone is additionally characterized by the fact that the liquid mixtures which enter the zone flow substantially horizontally through the zone. Thus, any given mixture enters one side of the zone, flows across the zone, and separates into two separate phases or layers, one of each liquid. And the separated liquids then leave the zone by means of separate withdrawal conduits provided in the opposite side of the zone.

The mixing zone of the present stage design comprises a vertically disposed, laterally confined chamber with an inlet end and an outlet end. The outlet end terminates within the settling zone preferably vertically intermediate the top and bottom surfaces of the layer of continuous phase liquid and laterally at the entrance end of the settling zone. Thus, two liquids to be mixed are passed substantially vertically through the mixing zone where they are thoroughly mixed; and the resulting mixture is then passed directly into the settling zone.

It is preferred that the mixing zone be provided with a packing material which is adapted for contacting one liquid with another. In general any of the packing materials that are conventionally employed for liquid-liquid processes such as solvent extraction, acid treating, caustic washing, etc., may be used in the present apparatus. Specifically, Raschig rings, Berl saddles, wire mesh, crinkled wire mesh and the like are very suitable. Crinkled wire mesh is especially satisfactory.

The packing material within the mixing zone should extend laterally throughout the zone and may extend vertically to the very outlet end of the zone. It is, however, preferably vertically spaced from the inlet end for reasons that will be discussed in greater detail later hereinafter.

Insofar as its structural relationship with the settling zone is concerned, the mixing zone should be placed such that its outlet end projects substantially within the interior of the settling zone. It is particularly preferred that the outlet end not pierce or extend vertically beyond the phase interface that exists within the settling zone. Instead, the outlet end preferably is spaced vertically from the interface a distance sufficient to permit liquid to flow from the outlet into the settling zone without passing through what would constitute a flow restriction.

The inlet end of the mixing zone may terminate vertically intermediate the vertical limits of the settling zone, or it may project entirely outside the settling zone. In any event, the entrance end proper of the mixing zone should be sealed from the settling zone, although suitable conduit means may be employed to recycle a portion of the continuous phase liquid from the settling zone to the mixing zone.

The inlet end of the mixing zone is covered with a plate which separates and seals this zone from a trap chamber portion which was mentioned briefly earlier herein. Flow of liquids into the mixing zone from the trap chamber is made possible by one or more conduits which pierce the separating plate and interconnect the trap chamber with the mixing zone. These conduits project beyond the surface of the plate into the trap chamber, and they preferably also so project into the mixing zone. In other words, the plate separating these two portions in each stage of the present apparatus is vertically intermediate and spaced from the ends of each of the riser conduits. For the sake of clarity the ends of the conduits that enter the mixing zone will be referred to as the downstream ends of the conduits, and the ends that project into the trap chamber will be called the upstream ends of the conduits.

One riser conduit between the trap chamber and the mixing zone in each stage may be used, but a plurality of them is preferred. It is further preferred that the riser conduit or conduits be uniformly distributed throughout the lateral cross-section of the entrance to the mixing zone. It is apparent that the conduits are smaller in cross-section than either the trap chamber or the mixing zone.

The trap chamber into which the upstream ends of the riser conduits project is an enclosed chamber adapted to receive the two partially immiscible liquids and to transmit them to the mixing zone. Accordingly, the trap chamber is provided with inlet conduits for both of the liquids in addition to the riser conduits that connect this chamber with the mixing zone. The upstream ends of the riser conduits are terminated within the trap chamber in spaced relation with the interior surfaces of the trap chamber that limit the trap chamber in both vertical directions. In this connection it will be noted that the plate separating the trap chamber from the mixing zone will generally constitute one of the two surfaces that vertically limit the trap chamber. Thus, this plate will generally constitute either the top surface or the bottom surface of the trap chamber. The upstream ends of the riser conduits, therefore, will always be spaced from this plate and also from the interior surface of the trap chamber that is vertically opposite from the plate.

Insofar as the upstream ends of the riser conduits are concerned, it is preferred that the peripheral edges of these ends be of a character to act as weirs. It is further preferred that the upstream ends be notched to resemble conventional trapezoidal, rectangular, triangular, etc. forms of notched weirs. It is particularly preferred that V-notch serrations be employed.

The continuous phase liquid is introduced into the trap chamber by means of a first inlet conduit which pierces the trap chamber at a point vertically beyond the upstream ends of the riser conduits. In other words, the continuous phase liquid enters the volumetric portion of the trap chamber which is vertically intermediate the upstream ends of the riser conduits and that interior surface of the trap chamber that is vertically opposite to the plate which separates the trap chamber from the mixing zone. Thus, in the absence of non-continuous phase liquid and assuming a sufficient head of continuous phase liquid, continuous phase liquid will enter the trap chamber, fill the trap chamber and then flow through the riser conduits into the mixing zone. The total continuous phase flow is forced to pass upward through the mixing zone by the aforementioned vertically disposed plate which confines the inlet end of the mixing zone from the settling zone.

The discontinuous phase liquid is introduced through a second conduit which pierces and enters the trap chamber at a point vertically intermediate the upstream ends of the riser conduits and the plate that separates the trap chamber from the mixing zone. It is preferred that this second conduit be positioned immediately adjacent the plate that separates the trap chamber from the mixing zone.

It is apparent that the non-continuous phase liquid as it enters the trap chamber must flow in a U-shaped pattern in order to enter the riser conduits. Thus, the non-continuous phase liquid first displaces continuous phase liquid from the volumetric portions of the trap chamber that exist within the trap chamber laterally intermediate and surrounding the riser conduits. Having displaced the continuous phase liquid from these parts of the trap chamber, the non-continuous phase liquid then spills over (or under) the upstream peripheral edges of the riser conduits, flows through the riser conduits and enters the mixing zone where it is contacted with the total continuous phase flow. The serrations along the peripheries of the upstream extremities of the riser conduits serve to provide uniform distribution of non-continuous phase into the upstream ends of the riser conduits and to provide a variable flow area for the non-continuous phase liquid. This variable flow area is self-compensating to changes in the flow rate and/or the physical properties of the discontinuous phase. The serrations also serve to break up the stream of non-continuous phase liquid entering each of the riser conduits into a plurality of streams. Thus, the non-continuous phase liquid is distributed substantially uniformly throughout the entire cross section of the entry to the mixing zone. In order to maintain the self-compensating feature of the riser conduits it is particularly desired that the serrations on the inlet ends of the riser conduits be of a depth and area such that the greatest flow of non-continuous phase liquid expected for any given liquid system is capable of flowing entirely through the serrations.

As mentioned earlier, it is preferred that the downstream ends of the riser conduits be vertically spaced from the upstream end of the bed of packing material which is provided within the mixing zone. It has been found that markedly superior mixing of the two immiscible liquids may be realized by employing this construction. The non-continuous phase liquid under these circumstances has been observed to form a thin film along the upstream surface of the packed bed; and it is the presence of this thin film that appears to account for a greatly improved uniformity of and degree of dispersion between the two liquids in the packed bed. It has been particularly found that the vertical spacing between the downstream ends of the riser conduits and the upstream end of the bed of packing material should be between about 1" and 6" and particularly from about 3" to 5".

Conduits or other suitable liquid passageways may be provided to permit recirculation of a portion of the continuous phase liquid from the settling zone back to the mixing zone.

It may be desirable in some instances to employ one or more mechanical mixers in the mixing zone of the present apparatus in place of or in combination with the aforementioned bed of packing material. The mixer may be selected from any of the types that are conventionally employed for liquid-liquid contacting operations. For example, suitable types include propeller mixers, turbo-mixers, paddles and the like. A particularly attractive type is the vibrating plate type of mixer described in the copending application of Fenske et al., Serial No. 75,904, filed February 11, 1949, now U. S. Patent 2,667,407.

It is apparent that when a mechanical mixer is used instead of a bed of packing material, the mixer need not be critically spaced from the riser conduits entering the mixing zone.

The single contacting stage described above may be readily adapted to provide a multi-stage type of vertical liquid-liquid contacting tower by merely vertically superposing a series of such stages one upon the other. The stages should be arranged so that the mixing zones of successive stages are laterally opposite from one another within the tower.

Suitable inlet and outlet connections for both the continuous phase liquid and the non-continuous phase liquid should be provided at the top and the bottom of the tower. Such connections and suitable valves and controls for rendering the connections operative are conventionally employed for liquid-liquid towers, and it is therefore felt that a detailed discussion of these portions of the apparatus is not necessary in the present description. It will be appreciated that the inlet connection for the continuous phase liquid and the outlet connection for the non-continuous phase liquid should be located at one vertical end of the tower; and the outlet connection for the continuous phase liquid and the inlet connection for the non-continuous phase liquid should be located at the opposite end of the tower. In this manner an overall countercurrent flow relationship may be maintained between the two liquids in the tower.

In a multi-stage tower of the present invention, the continuous phase liquid entering any given contacting stage is taken from the settling zone of a contacting stage on one side of the given stage; and the non-continuous phase liquid entering the given stage is taken from the settling zone of a contacting stage on the opposite side of the given stage.

Returning momentarily to the description of the single stage presented earlier, it will be apparent that the multi-stage flow pattern may be achieved by merely connecting the two inlet conduits entering the trap chamber of a particular stage to the appropriate withdrawal conduits in the settling zones of the stages that lie on each side of the particular zone. Thus, the continuous phase liquid conduit entering the trap chamber of a given stage may be connected with the layer of continuous phase liquid that exists in the settling zone of a stage on one side of the given stage; and the non-continuous phase conduit entering the trap chamber may be connected with the layer of non-continuous phase liquid that exists in the settling zone of a contacting stage on the opposite side of the given stage.

Although the preferred apparatus arrangement is with packing in the mixing zone, there are conditions when this tray arrangement would be used as herein described but without either packing or mechanical mixing in the mixing zone. Such an arrangement gives reasonably good extraction efficiency and is especially attractive where high flow rate capacity is needed in the tower. In fact, it has been found desirable in the solvent extraction of a lubricating oil as the discontinuous phase liquid to use packing in the trays in the upper half of the tower and to use no packing in the trays in the lower half of the tower. This is a particularly attractive arrangement in this instance because in the upper part of the extraction tower the phases are more difficult to mix and need the aid of packing to improve contacting efficiency. In the lower half of the tower, phase properties are such that mixing occurs easily and packing is not needed for contacting efficiency. Phase flow rates in the lower half are therefore higher and the more intimate mixing due to the packing is avoided since it would unnecessarily make settling more difficult.

The actual construction and operation of a multi-stage unit may be better understood by referring to the attached figures.

Figure I is a fragmentary elevational cross-section view of a multi-stage vertical tower embodying the principles of this invention in which the continuous phase liquid is heavier than the non-continuous phase liquid.

Figure II is a cross-section view of the tower depicted in Figure I as taken through the line II—II shown in Figure I.

Figure III is an isometric projection of riser conduit 30 shown in both Figures I and II.

Figure IV is an elevational cross-section view of a contacting stage which represents another embodiment of the present invention.

Referring first to Figure I it will be observed that the contacting tower 1 shown therein is a vertically elongated cylindrical vessel bounded laterally by side walls 2. Also shown are two contacting stages 3 and 4, the former stage being vertically superposed on the latter stage. Stage 3 is bounded vertically by the underside of plate 9 and the top surface of plate 10. Stage 4 on the other hand is bounded vertically by the under surface of plate 10 and the upper surface of plate 11. Plates 9, 10 and 11 are horizontally disposed, imperforate plates that are vertically spaced from one another within the vessel.

Each stage of the apparatus shown in Figure I comprises a settling zone, a mixing zone and a trap chamber. Thus stage 3 includes settling zone 5, mixing zone 6 and trap chamber 31. Stage 4 is made up of settling zone 7, mixing zone 8, and trap chamber 32.

Referring specifically to stage 3, it will be observed that this stage is bounded vertically by plates 9 and 10 and laterally by the walls 2 of vessel 1 and vertical plate 15. Plate 15 is laterally spaced from one side wall of vessel 1 and extends laterally and is sealed to the walls of the vessel. The upper horizontal edge of plate 15 intersects and is sealed to the terminal edge of plate 9 on one side of vessel 1. The lower horizontal edge of plate 15 extends beyond and is spaced from the under surface of plate 10. Plate 10 intersects and is sealed to plate 15 at a point intermediate the vertical ends of the latter plate. Thus, plate 15 not only partially defines settling zone 5; it also defines a conduit 12 which extends from the stage immediately above stage 3 to a point below plate 10.

Spaced inwardly from and parallel to vertical plate 15 is a second vertical plate 26. The lower horizontal edge of this plate intersects and is sealed to plate 10. The upper horizontal edge of plate 26 is spaced vertically from plate 10 and also from the underside of plate 9. Plate 26 also extends laterally and is sealed to the walls 2 of vessel 1. Thus, plate 26 in conjunction with plates 10 and 15 forms a laterally confined mixing zone 6 along one side of settling zone 5. The top of mixing zone 6 is open and communicates directly with the interior of settling zone 5. The upper horizontal edge of vertical plate 26 preferably terminates vertically below the phase interface that is maintained within the settling zone. Accordingly, in most conventional towers the upper edge will be from 9 to 18 inches and preferably 12 to 15 inches above plate 10. In this connection most conventional towers have contacting stages (and settling zones) that are about 12" to 36" high and most generally about 24" high.

Mixing zone 6 is preferably provided with a bed of packing material extending laterally throughout the cross-section of the zone. The upper edge of this bed may extend to the upper horizontal edge of plate 26 and in some instances may extend beyond this point. For example, it may be desirable to extend the bed all the way up to the underside of plate 9. The bottom limiting surface or edge of the bed, however, is maintained in a spaced relation vertically with respect to the upper surface of plate 10.

The packing material to be employed in mixing zone 6 may be selected from any of the types of packing materials that are conventionally employed in liquid-liquid contacting operations. Typical materials for this purpose include Berl saddles, Raschig rings, wire mesh, crinkled wire mesh, metal chain, crushed particles and the like. A particularly attractive material for this purpose is crinkled wire mesh. The wire mesh is formed from metal wire woven into strips which are stacked one on another to form pads about 1" thick each. The strip layers are crimped and stacked with the crimp on each layer being diagonal to that on adjacent layers. Stacking of the pads then gives the necessary height of mixing zone packing. A crinkled wire mesh that is particularly effective for this purpose may be fabricated from 0.011" diameter stainless steel wire packed to a density of 12.5 lbs./cu. ft. Wires of other diameters and compositions, however, may be employed; and the wires may be packed to densities other than the value stated.

The packing material within mixing zone 6 may be supported in any conventional manner as by grids that are attached to the side walls of the zone or supported from plate 10. Trap chamber 31 is limited vertically by the underside of plate 10 and the upper surface of plate 19. The latter plate is a substantially horizontal plate vertically spaced below the lower horizontal edge of plate 15 and extending inwardly from the wall of vessel 1. The term "inwardly" as used herein indicates a direction toward the central portion of tower 1. The inner limited edge of plate 19 terminates inward of and is spaced laterally from riser conduits 24. These conduits will be described in more detail later in the present description.

Vertical plate 22 is sealed along its lower horizontal edge to the inner limiting edge of plate 19. Plate 22 also extends vertically upward from plate 19 and terminates in a vertically spaced relation with the underside of plate 10. Thus, the upper horizontal edge of plate 22 forms a conduit 33 with the undersurface of plate 10.

Trap chamber 31 is thereby formed by horizontal plates 10 and 19 in combination with vertical plates 15 and 22. Trap chamber 31 is provided with a conduit 12 which connects the trap chamber with the settling zone of a contacting stage on one side of stage 3; it is also provided with a conduit 33 which connects it with the settling zone of a contacting stage on the opposite side of stage 3. Riser conduits 24 which pierce plate 10 provide a fluid passageway leading from the interior of trap chamber 31 to the interior of mixing zone 6. Riser conduits 24, as shown in Figures II and III, are each formed by two parallel vertical side walls 29 and two parallel end walls 30 which interconnect and are sealed to the side walls. The upper ends of riser conduits 24 terminate beyond plate 10 at a point intermediate the upper surface of plate 10 and the lower surface of the bed of packing material in mixing zone 6. In any event, it is a critical feature of the present invention that the lower surface of the bed of packing material be vertically spaced from the upper ends of the riser conduits. As explained earlier herein, this feature of the present apparatus greatly improves the contacting efficiency of the discontinuous phase liquid immediately below and adjacent the lower (i. e. upstream) surface of the bed of packing material. It is particularly preferred that the actual distance involved be from about 1" to 6" and especially about 3" to 5".

The lower or upstream ends of riser conduits 24 are positioned vertically intermediate the lower horizontal edge of plate 15 and the upper horizontal edge of plate 22. Thus, when trap chamber 31 is continuously supplied with a continuous phase liquid via conduit 12 and a discontinuous phase liquid via conduit 33, it is apparent that a double liquid trap is formed within the trap chamber. The position of the lower edge of plate 15 in relation to the lower edge of conduits 24 prevents discontinuous phase liquid from passing up through conduit 12; and conversely the position of the upper edge of plate 22 in relation to the lower ends of conduits 24 prevents continuous phase liquid from passing out of trap chamber 31 through conduit 33. The upper edge of plate 22 and the lower ends of conduits 24 in combination with plate 16 also serve to trap a layer of discontinuous phase liquid beneath plate 10. This liquid layer, unlike similar layers in perforated plate towers, will not disappear with changes in operating conditions, etc.

The lower edges of conduits 24 are preferably all on the same horizontal plane and are adapted to serve as weirs. The latter function is readily apparent when one observes that discontinuous phase liquid in flowing from trap chamber 31 through conduits 24 must pass over (or under) the lower ends of these conduits. It is particularly preferred that the conduit ends resemble notched weirs by being provided with serrations in the form of rectangles, trapezoids, squares, triangles, and so forth. Triangle or V-notched weirs, such as those shown in Figure III, are especially preferred. In any event, it is preferred that the notches be of a sufficient area in cross-section to accommodate the greatest flow of discontinuous phase liquid expected for any given liquid-liquid system. It will be noted that the weirs along the lower ends of riser conduits 24 are unique in that they are peripheral in design, extending entirely around the lower periphery of each riser conduit.

In the event that a single riser conduit is employed, it is preferred that such a conduit be located substantially along the vertical center line of mixing zone 6. When a plurality of riser conduits are used, it is preferred that the conduits be evenly spaced throughout the cross-sectional area of mixing zone 6. It is apparent that better distribution of the liquid impinging upon the lower surface of the bed of packing material in mixing zone 6 may be obtained by following these design considerations. The riser conduits may be rectangular in cross-section, as shown, or they may be circular, square or any other suitable geometric configuration.

To complete the description of the structure illustrated in Figures I and II, it will be noted that horizontal plate 10 extends laterally across and throughout tower 1 from plate 26 to the upper limiting edge of vertical plate 16. Plate 16 is similar in design and function to plate 15 and forms a conduit 13 through which the continuous phase liquid in settling zone 5 may pass to the next contacting stage 4. The discontinuous phase liquid in settling zone 5 leaves this zone through conduit 35 which terminates within trap chamber 36 of the contacting stage positioned directly above stage 3.

Referring briefly to the overall dimensions of the contacting stages in tower 1, it will be appreciated that such considerations are considered to be well within the knowledge of persons skilled in the art. For example, the lateral dimension of settling zone 5 must be sufficient to permit adequate settling of the liquid mixtures that are introduced within this zone. As mentioned earlier, the height of settling zone 5 may be generally from 12" to 36", preferably about 24". The overall volume of zone 5 may vary from one liquid-liquid system to another. For example, with phenol-oil systems the volume should provide about 1–10 minutes settling time. With other systems, other settling times may be required.

The apparatus illustrated in Figures I through III and described above may be better understood by briefly describing the manner in which it would be employed on a liquid-liquid system of the type with which the present invention is concerned. Thus, it will again be assumed that two liquids are being contacted and that the continuous phase liquid is the heavier of the two. Accordingly, the continuous phase liquid enters at the top of the tower and flows downwardly through the tower until it reaches an outlet connection provided at the bottom of the tower. Conversely, the discontinuous phase liquid enters the bottom of the tower and flows upwardly through the tower and leaves through a connection in the top of the tower. These connections are not shown in the figures, but their use and operation are well known and understood by those skilled in the art.

For the purposes of the present description it will be further assumed that the continuous phase liquid flows by gravity through the tower and that the tower in its start-up is initially completely filled with this liquid. The discontinuous phase liquid, as it is introduced within the bottom of tower 1, rises through the tower due to its buoyancy relative to the continuous phase liquid. Upon reaching the underside of plate 11, the discontinuous phase liquid is trapped by vertical plates 23, 16 and 17 and riser conduits 25 until a sufficient layer of the liquid forms under plate 11 to enable the liquid to enter the riser conduits 25 and to flow upwardly into mixing zone 8.

Simultaneously, the continuous phase liquid passing down the tower enters trap chamber 32 by flowing downwardly through downcomer conduit 13 and thence into the trap chamber. The continuous and discontinuous phase liquids then flow concurrently and vertically through riser conduits 25 and mixing zone 8. The mixture leaving the top surface of mixing zone 8 separates in settling zone 7 to form a distinct layer of each liquid. The discontinuous phase liquid rises to the top of zone 7 and is trapped under plate 10 in the same manner as under plate 11. The continuous phase liquid settles to the lower portion of zone 7 and flows transversely across tower 1 to downcomer 14 which lies between and is formed by the walls 2 of vessel 1 and vertical place 17. In some instances, a part of the latter liquid may be recirculated to mixing zone 8 by means of conduit 28. This procedure increases contacting efficiency but with some sacrifice in settling efficiency as occasioned by the added turbulence in the settling zone.

The discontinuous phase liquid under plate 10 flows through conduit 33 into trap chamber 31 and displaces continuous phase liquid from this chamber until the former liquid reaches the lower ends of the riser conduits 24. At this point the discontinuous phase liquid spills over the peripheral weirs provided on the lower ends of riser conduits 24 and is thereby distributed throughout the stream of continuous phase liquid that is flowing through these riser conduits. The continuous phase liquid enters trap chamber 31 via downcomer conduit 12, as has been described earlier in this description.

The combined stream of the two liquids flowing through riser conduits 24 impinges upon the upstream surface of the bed of packing material contained in mixing zone 6. As explained earlier, the upper ends of the riser conduits are vertically spaced from the bottom surface of the bed a sufficient distance to cause a thin layer of discontinuous phase liquid to form on that surface of the bed. Vertical plate 26, which confines mixing zone 6 from settling zone 5, assures that the total flow of continuous phase liquid is intimately mixed with the discontinuous phase liquid in mixing zone 6. The packing in mixing zone 6 retards the rate of rise of the discontinuous phase to give a long time of contact between phases in the mixing zone. The presence of the layer of the discontinuous phase on the bottom surface of the mixing zone and the confinement of the mixing zone and the retardation of the rise of discontinuous phase liquid have been found to greatly increase the mixing efficiency of the mixing zone and also the overall contacting efficiency of the stage.

Upon leaving mixing zone 6, the mixture of the two liquids is again settled in settling zone 5 to form two separate layers of the liquids. The continuous phase liquid flows substantially horizontally through settling zone 5 to downcomer conduit 13 where it then flows in a downward direction to enter contacting stage 4. The discontinuous phase liquid on the other hand gradually rises in settling zone 5, forms a distinct layer under plate 9 and then enters the trap chamber 36 of the contacting stage vertically above stage 3. Thus, the discontinuous phase liquid and the continuous phase liquid move substantially concurrently through each contacting stage but countercurrently between the stages.

Referring specifically to trap chamber 31, it will be noted that the phase interface between the two liquids within the trap chamber is indicated as being vertically lower than the phase interface within settling zone 7. It will be further noted, however, that the relative positions of these two interfaces may actually be reversed depending to a great extent upon the degree of hydraulic unbalance that exists in the hydraulic circuit within the apparatus that includes this trap chamber. It is this hydraulic unbalance which aids in driving the oil from the layer under plate 10 through conduit 33 and through trap chamber 31 into riser conduits 24. The unbalance is occasioned primarily by the fact that a dispersed phase of the two liquids being processed exists within conduits 24 and 25 as well as in mixing zones 6 and 8, while a column of substantially pure continuous phase liquid exists within settling zone 5 and downcomer conduit 13.

The unbalance may be better understood by considering that an imaginary manometer exists within this portion of the tower, both legs of the manometer terminating vertically at the phase interface in settling zone 5. One leg of the manometer may be considered to pass vertically down through mixing zone 6, riser conduits 24, trap chamber 31, conduit 33, mixing zone 8, and riser conduits 25, and to terminate in trap chamber 32 under the lower horizontal edge of plate 16. The other leg of the manometer may be considered to pass vertically downward through settling zone 5 and downcomer conduit 13 into trap chamber 32, terminating at the same point as the first leg of the manometer under plate 16. A cursory analysis of the hydraulics of such an imaginary manometer is sufficient to account for the hydraulic unbalance in the manometer since the manometer leg extending through settling zones 5 and downcomer conduit 13 is very obviously filled with a much denser and heavier liquid than the other leg of the manometer which extends through the two mixing zones.

It will be understood that the foregoing description has been concerned with merely one embodiment of the present invention. It is apparent that many modifications and variations may be incorporated within the embodiment given without departing from the spirit or scope of the present invention. For example, the contacting tower, as well as the downcomer conduits and the riser conduits may take on many geometric forms other than those described. Thus, any of these structures may be rectangular, circular or square in cross-section.

In some instances it may be desirable to tilt the horizontal plates 9, 10 and 11 slightly from the horizontal in order to promote the flow of liquids within the various settling zones. It may also be desirable to bevel or curve the intersections formed between these horizontal plates and the downcomer conduits leading from them to the succeeding stages in the tower. Again the physical dimensions of the settling zones, the mixing zones and the overall stages may be varied if necessary to meet the demands of any particular liquid-liquid system.

It will also be appreciated that the present apparatus may be adapted to a liquid-liquid system in which the continuous phase liquid is the lighter of the two liquids. In this instance, the contacting tower shown in Figure I may merely be vertically inverted thereby causing the continuous phase liquid to travel through the same conduits as before but in an opposite vertical direction. In this case, however, it will also be appreciated that it will be generally necessary to force the continuous phase liquid through the tower as by means of a suitable pump or pressure lift. It is apparent that the force of gravity cannot be relied upon in this case to move the continuous phase liquid in the path desired.

It is apparent that the present apparatus may be employed in a wide variety of liquid-liquid contacting operations and processes. Thus, in the petroleum industry alone it may be adapted for use in such processes as acid treating, caustic treating, solvent extraction, light hydrocarbon precipitation, sweetening, and the like. Its use, of course, need not be limited to this particular industry.

The present invention may be further understood by reference to the following examples wherein two mineral oils were separately contacted with phenol in a contacting stage substantially identical with the stage illustrated in Figure IV.

The mineral oils were distillate lubricating oil fractions. The origin and physical properties of the oils together with the contacting conditions are shown in the following table:

TABLE I

| Test Oil | A | B |
|---|---|---|
| Origin | Coastal Crude. | Mid-Continent Type Crude. |
| Gravity, °A. P. I. | 27.9 | 26.5. |
| Viscosity, S. S. U. @ 100° F. | 80 | 160. |
| Contacting Temperature, ° F. | 85 | 140. |
| Oil Feed Presaturation with Phenol, Vol. percent | 2 | 6. |
| Phenol Water Content, Vol. percent | 6 | 2. |

The oil, as it was fed to the contacting stage was partially presaturated in order to eliminate any saturation effect within the stage. The contacting stage was about 30" wide, 20" high and 4" deep, and therefore may be considered to represent a 4" slice or section taken through a 30" diameter extraction tower. The downcomer conduit was about 3" wide and extended to a point about 1½" from the bottom of the contacting stage. The bottom horizontal plate of the mixing zone was positioned about 1" above the lower end of the downcomer conduit. The mixing zone itself was 4" wide, 4" deep and about 12" high. The upper 9" of the mixing zone was packed with crinkled wire mesh supported by means of a ⅛" mesh screen basket. The crinkled wire mesh was fabricated from 0.011" diameter stainless steel wire packed to a density of 12.5 lbs. per cubic foot. The crinkled wire mesh had a surface area of approximately 130 sq. ft. per cubic foot and also possessed a free volume of about 98% of its total volume.

The trap chamber of the test apparatus was formed essentially as shown in Figure IV. A riser conduit interconnecting the trap chamber with the mixing zone was 2″ in diameter and extended about ¾″ into the trap chamber and about ½″ into the mixing zone. The top of the riser conduit was positioned about 2½″ from the bottom of the bed of packing material. The lower periphery of the riser conduit was provided with 16 triangular notches each about ⅜″ wide at its base and ¾″ high.

Extraction runs were made in the contacting stage described above using test oils A and B which were contacted at a variety of feed rates with and without packing material in the mixing zone. The results of these runs are summarized in the following table:

TABLE II

TEST OIL A

| Oil Dispersion Method | Circular, V-Notched Weir (24, Fig. IV) | | | |
|---|---|---|---|---|
| Vertical Plate Present [1] | Yes | | | |
| Packing Present | No | | Yes | |
| Oil Rate, G. P. H. | 15 | 95 | 16 | 100 |
| Phenol Rate, G. P. H. | 15 | 95 | 16 | 100 |
| Efficiency, percent | 40 | 47 | 74 | 62 |

TEST OIL B

| Oil Dispersion Method | Circular, V-Notched Weir (24, Fig. IV) | | | | | |
|---|---|---|---|---|---|---|
| Vertical Plate Present [1] | Yes | | | | No | |
| Packing Present | No | | Yes | | No | |
| Oil Rate, G. P. H. | 21 | 81 | 21 | 82 | 21 | 86 |
| Phenol Rate, G. P. H. | 21 | 81 | 21 | 82 | 21 | 86 |
| Efficiency, percent | 53 | 85 | 88 | 80 | 42 | 72 |

[1] Plate 26, Figure IV.

It is apparent from the data presented above that the present herein described apparatus employing a circular, V-notched weir with a packed mixing zone gives extremely high stage efficiencies for liquid-liquid contactng operations. It is also apparent that each of these features is necessary for high efficiency. For example, with Test Oil A and also Test Oil B, generally higher stage efficiency resulted with the circular, V-notched weir and packing than with the same arrangement without packing. Also, for Test Oil B the efficiency with the circular, V-notched weir with vertical plate and without packing was higher than with the same arrangement without the vertical plate. In other words, it is desirable to have the mixing zone laterally confined and segregated from the settling zone in order to minimize turbulence in the latter zone. It is interesting that the present apparatus is capable of high efficiency operation with or without packing material within the mixing zone. The presence of a packing material, however, is eminently desirable.

What is claimed is:

1. An apparatus for countercurrently contacting two incompletely miscible liquids having different specific gravities wherein one of the liquids is present as a continuous liquid phase and the other liquid as a discontinuous liquid phase within the apparatus, which comprises: a vessel; a plurality of vertically spaced horizontally disposed, imperforate plate members within said vessel forming a plurality of vertically superposed contacting stages therein; an inlet at a first vertical end and an outlet at the opposite end of said vessel for passing the continuous phase liquid through the vessel; an inlet at said opposite end and an outlet at said first end of the vessel for passing the discontinuous phase liquid through the vessel; a horizontally disposed settling zone in each contacting stage with an entrance at one end and an exit at the opposite end and arranged to separate mixtures of the two liquids into two phase layers; the entrance ends of successive settling, zones being laterally opposite one another within said vessel; a vertically disposed laterally confined mixing zone in each stage with an upstream end and a downstream end; the downstream end of each mixing zone facing toward said first end of said vessel and discharging substantially directly into the entrance end of the settling zone in its respective stage; each mixing zone containing a mixing section and a trap chamber section; each said mixing section being downstream from its trap chamber section; a horizontally disposed solid plate intermediate the vertical ends of each trap chamber section and extending laterally throughout the section; a riser conduit piercing each said solid plate and having an upstream end and a downstream end; the upstream end of each riser conduit terminating within its respective trap chamber section in vertically spaced relation with its respective solid plate; the downstream end of each said riser conduit terminating in spaced relation with its respective solid plate and also with the upstream end of its respective mixing zone; the outer surface of each said riser conduit forming an annular space with the inner surface of its respective trap chamber section; a plurality of first conduit members within said vessel arranged to effect flow of discontinuous phase liquid from stage to stage; one of said first conduit members piercing each said trap chamber to convey the discontinuous phase liquid from the exit end of the settling zone of any given stage to the trap chamber section of the mixing zone in that next adjacent stage which is intermediate said given stage and the continuous phase liquid inlet to the vessel; the upstream end of the said first conduit member in the given stage being vertically intermediate its respective imperforate plate member and the downstream end of the mixing zone in the given stage; the downstream end of each said first conduit member terminating within that portion of the annular space in its respective trap chamber section which lies vertically intermediate the solid plate and the upstream end of the riser conduit contained therein; a plurality of second conduit members in said vessel arranged to pass the continuous phase liquid from stage to stage; one of said second conduit members piercing each said imperforate plate member to convey the continuous phase liquid from the exit end of the settling zone of any given stage to the trap chamber section of the mixing zone of that next adjacent stage which is intermediate the given stage and the discontinuous phase inlet to the vessel; the downstream end of each said second conduit member terminating within its respective trap chamber section vertically intermediate the solid plate contained therein and the upstream end of the trap chamber section.

2. Apparatus as defined in claim 1 in which at least one of the mixing sections is provided with mixing means which is adapted for liquid-liquid contacting.

3. Apparatus as defined in claim 2 in which the mixing means is a bed of packing material.

4. Apparatus as defined in claim 3 in which the packing material comprises crinkled wire mesh.

5. Apparatus as defined in claim 3 in which the upstream end of each bed of packing is vertically spaced from the downstream end of the riser conduit in its respective mixing zone.

6. Apparatus as defined in claim 1 in which the upstream end of at least one of said riser conduits is serrated to form a notched type weir.

7. Apparatus as defined in claim 1 in which at least one stage is provided with a liquid passageway interconnecting the upstream end of the mixing section and the settling zone contained in the stage to recycle a portion of discontinuous phase liquid in the settling zone to the mixing zone.

8. Apparatus as defined in claim 1 in which the downstream end of at least one of the second conduit members terminates within its respective trap chamber section vertically intermediate the upstream end of the riser conduit contained therein and the upstream end of the trap chamber section.

References Cited in the file of this patent

UNITED STATES PATENTS

| | | |
|---|---|---|
| 2,037,318 | Fenske et al. | Apr. 14, 1936 |
| 2,290,209 | Rosenthal | July 21, 1942 |
| 2,520,391 | Findlay | Aug. 29, 1950 |
| 2,588,794 | Barton | Mar. 11, 1952 |
| 2,609,277 | McNamara | Sept. 2, 1952 |
| 2,667,407 | Fenske et al. | Jan. 26, 1954 |